Aug. 30, 1949.                 J. F. G. PETIT                 2,480,305
                        COMMUTATOR ELECTRIC MACHINE
Filed March 8, 1946                                   2 Sheets-Sheet 1
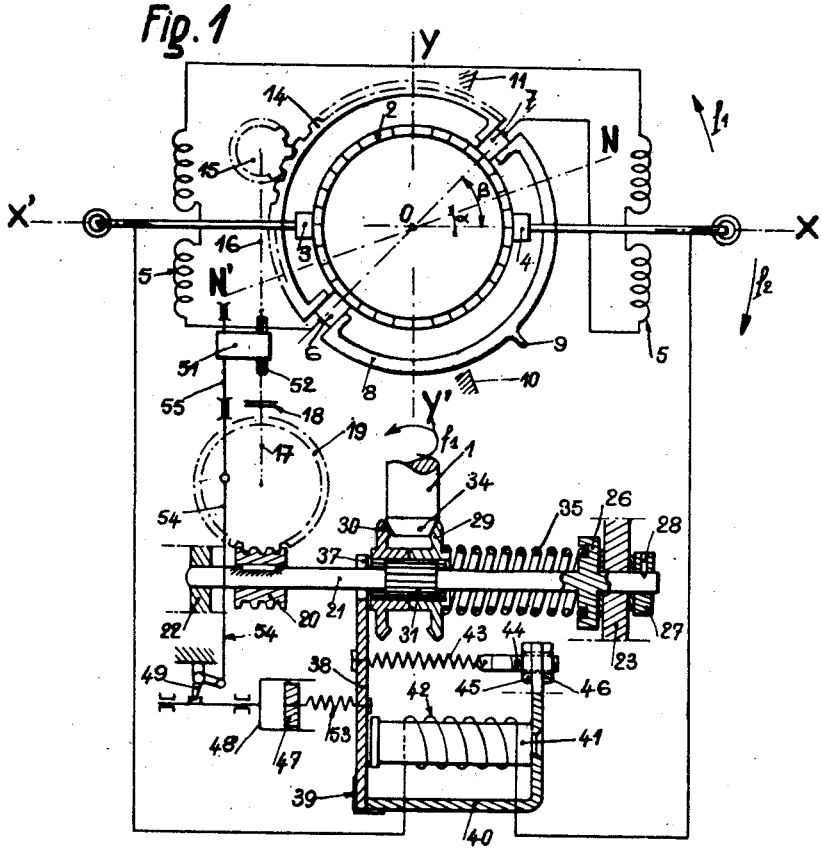
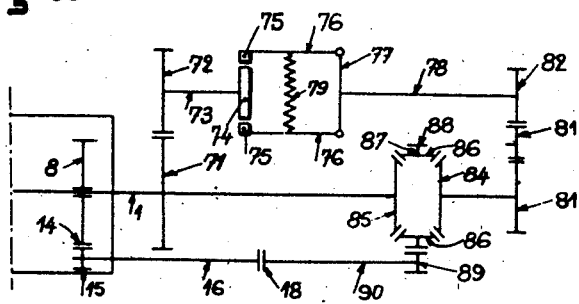
Jean François Gabriel Petit
INVENTOR
his ATTY.

Aug. 30, 1949.  J. F. G. PETIT  2,480,305
COMMUTATOR ELECTRIC MACHINE
Filed March 8, 1946  2 Sheets-Sheet 2
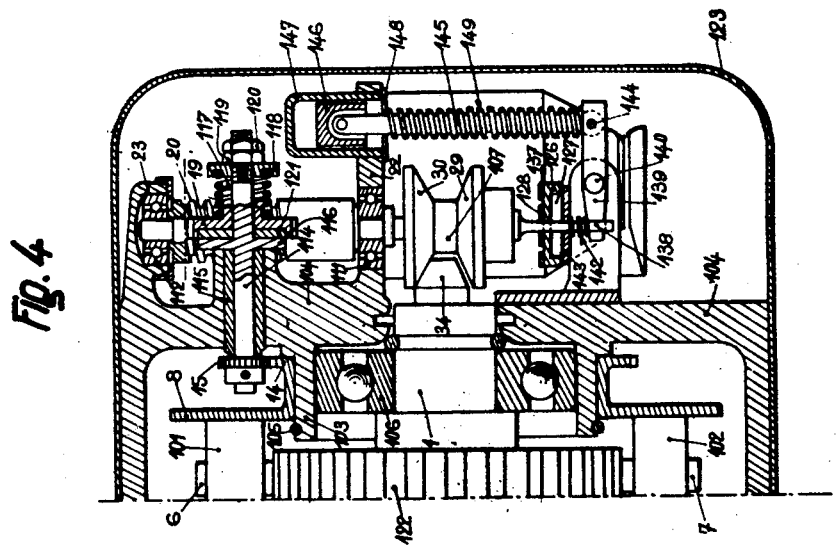
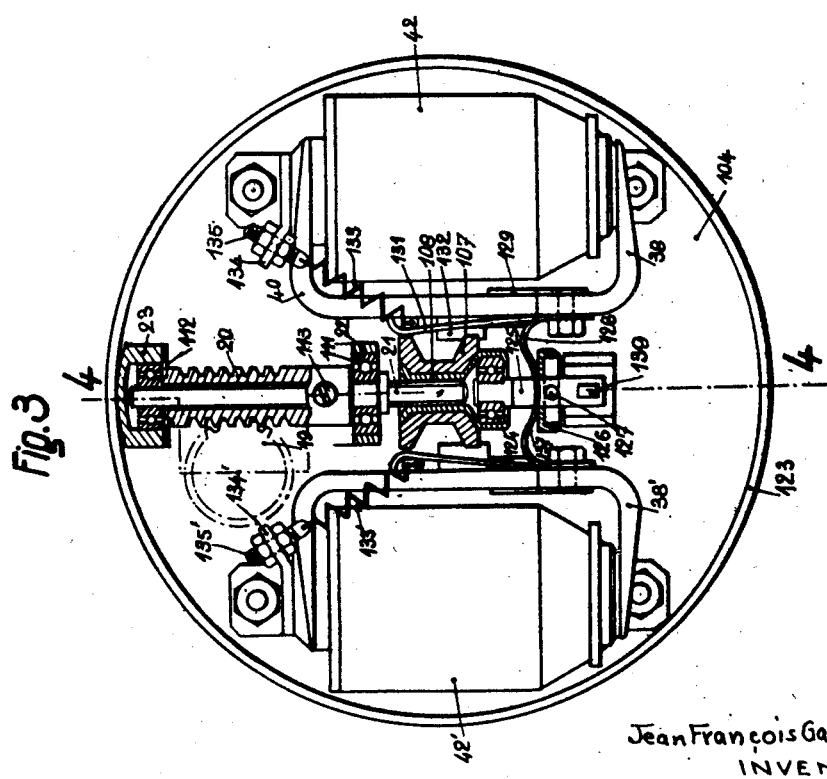
Jean François Gabriel Petit
INVENTOR
By [signature]
his ATTY.

Patented Aug. 30, 1949

2,480,305

UNITED STATES PATENT OFFICE 2,480,305

COMMUTATOR ELECTRIC MACHINE

Jean Francois Gabriel Petit, Paris, France, assignor to Societe d'Exploitation de Brevets, Paris, France Application March 8, 1946, Serial No. 652,919
In France March 8, 1945

1 Claim. (Cl. 322—55)

In order to maintain the voltage at the terminals of a dynamo constant when it operates at variable load and speed use is ordinarily made of a regulator influenced by the voltage to be regulated.

In all known regulators the measuring device modifies directly or indirectly the value of a resistance inserted in series in the excitation circuit of the dynamo.

The modification of this resistance necessitates either the alternate short-circuiting of a fixed resistance or the displacement of a cursor over contacts connected to resistances. In either instance there is frequently separation of contacts in series with a circuit presenting self induction as the result of which great alteration of these contacts takes place.

The correcting effect is also known which is obtained by means of an auxiliary brush contacting with the commutator of a dynamo which charges a battery of accumulators, the field magnets of the dynamo being fed under the voltage supplied by this auxiliary brush. When the voltage of the dynamo tends to vary the current delivered also varies and the neutral line is displaced which corrects the voltage collected at the auxiliary brush and produces the regulating effect sought on the excitation current of the dynamo. Nevertheless in order that the arrangement can operate it is necessary that the dynamo supplies a battery permanently.

The present invention has for its object the automatic regulation of the excitation current of an electric commutator machine, and in particular, in the case of a dynamo branched on any circuit, the regulation of its voltage whatever its load and its speed of rotation without making use of arrangements presenting the disadvantages referred to above.

According to the invention the field magnets of a dynamo are fed with the voltage collected by two brushes contacting with the commutator of the machine of which one at least is movable and carried by a ring or disc the angular displacement of which in relation to the neutral line is variable and regulatable as a function of one at least of the variable characteristics of operation of the machine.

Preferably the variable angular displacement of the brush-carrying ring is limited by suitable stops and the variations of this displacement are controlled by an arrangement comprising one or more electro-magnets influenced by the voltage of the dynamo and/or by the current which it supplies, a reversing clutch the driving member of which is rotated by its movement on the shaft of the dynamo and the driving member of which is operatively connected with said ring, the engagement of said clutch being controlled by said electro-magnet or electro-magnets, and a transmission with a torque limiter connecting said clutch with said ring.

The arrangement according to the invention is equally applicable to a motor but while for a dynamo the excitation current is adjusted to regulate the values of the voltage and/or the current of the machine whatever be the speed of rotation and the load, in motors which are usually supplied under a constant voltage the excitation current could be adjusted if desired with a view to regulating the speed of rotation and/or the current absorbed by this motor.

Other characteristics of the invention will appear from the following description with reference to the accompanying drawing which shows, by way of example, one embodiment of the invention.

In the drawings

Fig. 1 is the diagram of an embodiment of the invention applied to a dynamo.

Fig. 2 is a diagram of a variant of the arrangement applied to a motor.

Fig. 3 is an end view of a practical construction of the arrangement of the invention partly in section, with the protecting cover removed and Fig. 4 is a section approximately on the line 4—4 of Fig. 3.

Referring to Fig. 1, I indicates diagrammatically the armature shaft of a dynamo, 2 the commutator connected in usual manner to the winding of the armature (not shown), 3 and 4 are the main brushes which permit of collecting the current delivered by the machine.

5 are the field magnets. They are electrically connected to two auxiliary brushes, 6 and 7 mounted on an insulated movable disc 8 adapted to pivot through a certain angle about the centre O of the armature. A projection 9 in one with this disc may cooperate with two fixed stops 10 and 11 to limit the angular displacement of the latter. The arrangement is such that when the projection 9 abuts against the stop 10 the neutral line N—N' or line of the points of highest and lowest potential respectively on the commutator, while being assumed to be displaced to the maximum extent would still be located between the auxiliary brush 7 and the main brush 4 and when the projection 9 abuts against the stop 11 the auxiliary brushes 6 and 7 occupy a position symmetrical with the preceding with respect to the axis y—y'.

A portion 14 of the disc 8 is toothed and meshes with a pinion 15 mounted on a shaft 16 located in the continuation of a shaft 17 and connected to the latter by a torque limiter 18. On the shaft 17 is keyed a toothed wheel 19 meshing with a worm 20 on a shaft 21 which may rotate in two bearings 22 and 23 fixed on the machine.

The shaft 21 has a shoulder 26 which bears against one face of the bearing 23 while there bears on the other face a ring 27 secured to the shaft 21 by a set screw 28. Two conical rollers 29 and 30 are splined to shaft 21 by flutes 31. They are adapted to engage the complementary conical end 34 of the shaft 1 of the dynamo, thus forming a reversing clutch between shaft 1 and shaft 21.

The length of the hubs of the conical rollers 29 and 30 is such that when these hubs contact the rollers cannot both contact at a time with the cone 34.

A compression spring 35 bears on the one hand on the shoulder 26 of the shaft 21 and on the other on the outer face of the conical roller 29 which thus tends to be displaced to the left of the drawing and consequently to bear against the cone 34.

On the outer face of the other conical roller 30 bears a fork 37 formed in the end of a lever 39 which constitutes the movable blade of an electro-magnet. This blade is pivoted by means of a hinge 39 on a frame 40 supporting the core 41 of the electro-magnet. The winding 42 of this electro-magnet is connected to the two main brushes 3 and 4 of the dynamo.

The blade 38 is connected to the frame 40 by a tension spring 43 the tension of which is adjustable by means of a device comprising a screw threaded rod 44 held in place in a hole in the frame 40 by two nuts 45 and 46. The action of the compression spring 35 on the blade 38 is stronger than that of the spring 43. Finally the blade 38 is also connected through the medium of a loaded spring 53 (having unconnected spirals and which consequently can work both in compression and in tension) to a piston 47 which may be displaced with slight play in a cylinder 48 movable longitudinally under the action of a mechanism shown very diagrammatically in the drawing and which comprises the bell crank 49, the rod 54 and the rod 55 connected with a nut 51 in engagement with a screw 52 keyed on the shaft 16.

The operation of this arrangement is as follows:

It is assumed that the machine has been stopped and it is driven under no load at an increasing speed in the direction of the arrow $f'$. So long as the dynamo has not attained a determined speed its voltage at the terminals (3, 4) is not sufficient to attract the blade 38 of the electro magnet. It follows that the spring 35 presses the roller 29 against the cone 34 and that the system 21, 20, 19, 17, 18, 16, 15 drives the disc 8 in the direction of the arrow $f^2$ until the projection 9 comes in contact with the stop 10. From this moment the torque limiter 18 slips while the speed of the dynamo and its voltage continue to increase and the machine functions with full excitation, the auxiliary brushes being then in their position nearest the axis X—X' which represents at the same time the position of the neutral line since the dynamo operates without load. For a certain value of this voltage the attraction of the flux of the coil 42 of the electro magnet added to the pulling force of the regulating spring 43, preponderates over the action of the spring 35. It follows that the blade 38 presses the conical roller 30 against the cone 34 and that in consequence the mechanism for regulating the auxiliary brushes is driven in the opposite direction the latter being displaced in the direction of the arrow $f'$. They move away from the axis X—X' and consequently the excitation voltage falls and by way of consequence the voltage of the dynamo also. The voltage continuing to fall the attraction of the coil 42 of the electro magnet is no longer sufficient to attract the blade 38 and the spring 35 becoming in turn preponderant pushes the conical roller 29 against the cone 34, the brushes are displaced again in the opposite direction and approach the axis X—X', the voltage rises again and so on. It will be seen thus that when the dynamo has reached its working speed for a definite value of the voltage the blade 38 is in equilibrium and the auxiliary brushes are immovable in an intermediate position.

When the dynamo delivers current the neutral line is displaced in the direction of rotation of the armature and occupies for example the position indicated at N—N' in the drawing and making an angle $\varphi$ with the axis X—X'. The auxiliary brushes 6 and 7 occupy a position making an angle $\beta$ with the axis X—X' such that $\beta$ is greater than $\varphi$. According as the speed of the dynamo increases or decreases about its mean speed the variations of voltage which would have a tendency to be produced are immediately compensated by a suitable displacement of the auxiliary brushes which move away from or approach the neutral line. On the other hand in spite of the fact that the speed of the dynamo remains constant in existing installations it may happen that its voltage at the terminals is modified by reason of the variation of the load. In effect if the load increases the voltage has a tendency to fall but the neutral line is displaced in the direction of rotation of the armature which increases the voltage at the auxiliary brushes and already tends to make the necessary correction independently of the displacement of the brushes due to the operation of the regulating mechanism. As a result for variations of load of the dynamo the auxiliary brushes on the one hand and the neutral line on the other come in front of one another or separate from one another according as the load increases or is reduced, i. e., the voltage has a tendency to decrease or increase. This phenomenon has a direct consequence to increase the speed of the correction due to the regulator.

When the dynamo is stopped the auxiliary brushes come again into the position nearest the position X—X', the projection 9 is in contact with the stop 10 and the torque limiter 18 slips.

It has already been stated that the voltage of the dynamo is defined by the position of equilibrium of the blade 38 under the action on the one hand of the flux of the electro magnet 42 and of the attraction of the spring 43 and on the other, under the action of the opposing spring 35. The compensated servo device described above has for its object to avoid the phenomenon of possible oscillations in the course of the regulation, the displacements of the cylinder 48 connected to those of the auxiliary brush-carrying disc oppose through the medium of an air cushion contained in this cylinder a force of direction opposite to that of the displacement of the blade 38. This is the servo device and this force is dissipated gradually by reason of the leakage provided between the piston 47 and the cylinder 48. This is the compensating part. It is important not to modify in a permanent manner the conditions of equilibrium of the blade 38 if it is desired to maintain a constant voltage.

Obviously any other known servo compensating device could be employed.

It has been assumed in the foregoing that the dynamo rotates always in the same direction and the arrangement described presents the great advantage of permitting the rotation in both directions without interrupting the supply to the field magnets during the change of direction of rotation. In fact if the machine is taken to the point where it is desired to leave it, i. e., at the stoppage after an operation for a rotation in the direction of the arrow $f'$, if it is now driven in the opposite direction (direction of arrow $f^2$) the following phenomena arise.

On starting, the voltage of the dynamo is practically nil. It is due simply to residual excitation. By analogy with the operation already described for the other direction of rotation the auxiliary brushes are to be moved in the direction of the arrow $f'$ but this time, the polarity of the dynamo being reversed due to the inversion of its direction of rotation, the auxiliary brushes tend to place themselves in a position of equilibrium symmetrical with that which they had with respect to the axis $y$—$y'$ and consequently their polarity is reversed so that the field magnets are supplied by a current which reinforces the residual excitation and which is always in the same direction whatever the direction of rotation of the dynamo. Under these conditions the machine does not refuse to start and may operate indifferently in one or other direction. In the case where the machine is to be branched on a circuit of definite polarity it is sufficient to effect this branching through the medium of a polarised relay.

In this arrangement according to the invention the regulator is not in action in a permanent manner like the regulators with vibrating brushes for example, it only enters into operation when the speed of the dynamo varies or the field magnet circuit is heated, a variation of load being compensated automatically by the displacement of the neutral line as explained above. The wear on the regulating members is thus reduced to a minimum and the safety of operation is incomparably greater than that of the majority of known types of regulators which require contacts.

It has been assumed hitherto that the excitation current of a dynamo was adjusted with a view to regulating its voltage and to maintain it at a constant value. One could also make use of the same device to regulate the excitation current of a dynamo as a function of the current delivered, to limit the current to a definite maximum value. One could combine also the regulations of the voltage and of the current and for this purpose associate a shunt coil like the coil 42 shown in the drawing with a series coil.

Finally the same principle may also be utilised for the regulation of motors, the latter are generally supplied under a constant voltage, and by adjusting their current of excitation, their speed could be regulated and the current limited and consequently the power they absorb. Fig. 2 shows diagrammatically a variant of the arrangement applied to the regulation of the speed of a motor M.

On the shaft 1 of the motor is keyed a toothed pinion 71 meshing with another toothed pinion 72 keyed on a shaft 73. The number of teeth of the pinion 72 is less than that of the pinion 71. On the shaft 73 is keyed a plate 74 on the periphery of which may press two brushes 75 carried by arms 76 pivoted to a cross member 77 carried by a shaft 78. A tension spring 79 tends to press the two brushes 75 on the plate 74.

On the shaft 78 is keyed a toothed pinion 82 driving through the medium of a pinion 81 an identical tooth pinion 83 connected with a planet wheel 84 of a differential, the other planet wheel 85 of which is carried by the shaft 1. The satellites 86 of the differential are carried by a disc 87 provided with a tooth 88 meshing in turn with a pinion 89 mounted on a shaft 90 in the extension of which is disposed a shaft 16 connected to the shaft 90 by a couple limiter 18. The shaft 16 carries a pinion 15 meshing with the tooth part 14 of a disc 8 which carries the excitation brushes of the motor in accordance with the diagram of Fig. 1.

The operation of this arrangement is as follows:

The motor being at its normal speed if it is assumed for example that it slows down, the planet wheel 85 of the differential also slows down while the other planetary wheel 84 continues to run at constant speed since it is driven by a system controlled by centrifugal masses 75 the arrangement of which constitutes a known speed regulator.

It follows that the disc 87 of the differential rotates and causes the pinion 89 to rotate which pinion through the medium of the shafts 90 and 16 drives the pinion 15 and the disc 8 which carries the auxiliary brushes in the direction which reduces the excitation current to cause the speed of the motor to rise to the value which it should have in normal running.

Inversely if the motor is accelerated, the brush-carrying disc would be driven in the opposite direction to increase the exciting current and bring the speed back to its normal value. This arrangement in accordance with the diagram of Fig. 2 presents the great advantage of being very sensitive, it is applicable particularly to small motors.

For large motors, if it is desired to maintain fineness of regulation, the rotation of the auxiliary brush-carrying disc 8 should be controlled not directly by the differential 84, 85, 86 but through the medium of a system of conical rollers such as that shown diagrammatically in Fig. 1 itself controlled by this differential.

There is shown in Figs. 3 and 4 an embodiment of the arrangement forming the subject of Fig. 1. The same references have been used as far as possible to designate the same parts and supplementary references have been adapted to designate the parts necessary for the construction and which have not been shown in detail in the diagram of Fig. 1. 6 and 7 are the two auxiliary brushes mounted in the usual manner in cages 101, 102 pressed against the commutator 122 by springs, not shown, and connected to the field magnets by the usual connections, also not shown.

The cages 101, 102 are mounted on the disc 8 and suitably insulated with respect thereto. The latter may turn freely on a hub 103 of bearing 104 and is held in place axially by split ring 105 disposed in a suitable groove in the hub 103. The shaft 1 of the dynamo is held in the bearing 104 by a ball bearing 106 and terminates in a conical end 34 with which may cooperate two conical parts 29 and 30 of a double bevel roller 107. This roller is made of material having a high coefficient of friction and is mounted on a socket 108 which may slide on the shaft 21 but which is connected on rotation by means of an arrangement with splines or flats. The shaft 21 is carried by two ball bearings 111 and 112 located on the parts 22, 23 connected to the bearing 104. On the shaft 21 is mounted a worm 20 by means of a screw 113 which bears on a flat on the shaft 21.

The worm 20 meshes with the wheel 19 mounted freely on a shaft 114 which turns in a socket 115 fitted in the bearing 104. The shaft 114 carrying at one of its ends the pinion 15 meshes with the toothed disc 14. The shaft 114 is provided with a shoulder 116 on which the toothed pinion 19 presses through the medium of a washer 121 having a suitable coefficient of friction under the action of a spring 117 the pressure of which is adjustable by means of plate 118 held in place on the shaft 114 by the nut 119 and lock nut 120.

The socket 108 which carries the bi-conical roller 107 holds at one of its ends a bearing 124 in which is mounted a rod 125 which serves to transmit to the roller 107 the axial movements. For this purpose on the axle 125 is threaded a plate 126 held in place by a pin 127 which is thus held in the plate after fitting. On the outer face of the plate 126 bears a fork 128 connected with the movable blade 38 of an electro-magnet 42 which constitutes the regulator supplied under the voltage of the dynamo. The magnetic circuit 40 of this regulator is carried also by the main bearing 104 and the blade 38 is pivoted to the armature 40 by the hinge 129. The movable blade 38 is extended by an arm 131 carrying a balancing runner 132 and on which is hooked one end of the tension spring 133, the other end of which is hooked at 134 on a support, connected to the armature 40 of the electro-magnet, the tension of the spring being adjustable by means of a screw threaded device 135.

Another electro-magnet 42' is mounted symmetrically of the electro-magnet 42 with respect to the plane passing through the line 4—4 and at right angles to the plane of the drawing of Fig. 3. This electro-magnet 42' is supplied by the main current delivered by the dynamo or a fraction only of this current and acts as a current regulator.

A fork 137 connected with its movable blade 38' bears like the fork 128 of the other electromagnet on the outer face of the plate 126.

Finally the end of the rod 125 is formed with an opening 138 in which is engaged one end of a lever 139 which turns on an axle 140 in one with the main bearing 104. A small spring 142 is interposed between the lever 139 and the plate 126 through the medium of a washer 143 bearing suitably on the edge of the plate. This small spring 142 has merely for its object to reduce the play in the transmission thus formed.

The other end of the lever 139 is pivoted at 144 on a rod 145 connected with a piston 146 capable of being displaced with slight play in a cylinder 147 connected with the main bearing 104. A washer 148 located at the inlet of the cylinder serves as an abutment for a compression spring 149, the other end of which bears on the lever 139. This spring acts on the blades 38, 38' of the electro-magnets in opposition to the flux of attraction. The adjustable springs 133, 133' serves practically only as means of exact regulation for adjusting the position of equilibrium of each of the two electro-magnets. A casing 123 protects the whole of these apparatus.

The function of this device has already been described in detail with respect to Fig. 1. The principle of this embodiment corresponds to that of the diagram explained. There has been added a second electro magnet 42' which serves as a current regulator, the electro-magnet 42 serving as a voltage regulator. Nevertheless this servo and compensation system shown in the diagram Fig. 1 has been simplified in the practical embodiment just described and which is sufficient in application. Movements of the blades of the electro magnets are simply damped by the resistance of the displacement of the piston 146 in the fixed cylinder 147.

Obviously the invention is not limited to the details above described which are given only by way of example.

Thus, in the arrangement described it is assumed that the auxiliary brush 7, Fig. 1, would move away or approach the main brush 4 at the same side as the neutral line with respect to this main brush but there could be provided an analogous regulating arrangement in which the auxiliary brush and the neutral line would be on opposite sides of the main brush. In this latter case the correction would be obviously much slower for the same variations of load, since the displacement of the neutral line with respect to the auxiliary brush would take place precisely in the opposite to the correcting direction and the auxiliary brush would necessarily have to be displaced for simple variations of the load. This latter arrangement would consequently be used for installations having sudden variations in speed.

Finally it has been assumed hitherto that the field magnets of the machine were supplied between two auxiliary brushes but they could be branched between an auxiliary brush (7 for example) and the opposite main brush 3. In this case if the machine is to function in both directions of rotation it is necessary at the moment of reversal to connect to the opposite brush 4 the connection of the field magnet originally connected to the main brush 3; otherwise obviously no power could be collected after reversal of the direction of rotation of the machine.

Having now described my invention, what I claim as new and desire to secure by Letters Patent is:

In a dynamoelectric machine having a rotatable member with a commutator, a set of load brushes and a set of auxiliary brushes cooperating with said commutator, field exciting windings adapted to be energised by the voltage across said auxiliary brushes, a ring mounted for rotation about said commutator, one at least of said auxiliary brushes being carried by said ring, two stops for limiting angular displacements of said ring, an electromagnet connected in an electric circuit of the machine, an armature for said electromagnet movable in response to variations of the current flowing therethrough, means operatively connecting said ring with said rotatable member said means including a reversing clutch adapted to drive selectively said ring in opposite directions under control of said movable armature and a torque limiter, and a dashpot operatively connected to said ring to restrain excessive movements thereof.

JEAN FRANCOIS GABRIEL PETIT.

REFERENCES CITED

The following references are of record in the file of this patent:

UNITED STATES PATENTS

| Number | Name | Date |
|---|---|---|
| 269,805 | Maxim | Dec. 26, 1882 |
| 324,566 | Lannert | Aug. 18, 1885 |
| 437,704 | Lundell | Oct. 7, 1890 |